United States Patent
Grinchenko et al.

[15] 3,693,077
[45] Sept. 19, 1972

[54] ELECTRIC DRILL

[72] Inventors: Nikolai Nikolaevich Grinchenko, ulitsa Tonkopia, 24a, kv. 26; Vadim Vyacheslavovich Abakanovich, ulitsa Lermontovskaya, 37, kv. 38; Jury Moiseevich Goldshtein, ulitsa Olminskogo, 17, kv. 1; Grigory Zakharovich Gurevich, ulitsa Karelskaya, 14, kv. 39; Viktor Gavrilovich Chepelev, Moskovsky prospekt, 232a, kv. 10, all of Kharkov; Vladimir Zakharovich Kuvshinov, ulitsa Gastello, 8, kv. 33, Moscow, all of U.S.S.R.

[22] Filed: June 4, 1971

[21] Appl. No.: 150,121

[52] U.S. Cl. ...................324/54, 310/50, 310/66, 175/40, 174/47
[51] Int. Cl. .............................................G01r 31/12
[58] Field of Search ............310/80, 47, 68, 68 C, 66; 175/40; 174/47; 166/65; 324/54

[56] References Cited

UNITED STATES PATENTS

| | | |
|---|---|---|
| 3,546,502 | 12/1970 | Botefuhr......................310/50 |
| 3,546,556 | 12/1970 | Benkert........................310/50 |
| 2,993,391 | 7/1961 | Raney..........................310/50 |

*Primary Examiner*—J. D. Miller
*Assistant Examiner*—R. Skudy
*Attorney*—Waters, Roditi, Schwartz & Nissen

[57] ABSTRACT

An electrical drill for drilling oil and gas wells is disclosed. The electrical drill comprises a housing which accommodates a three-winding-phase electric motor with a cable lead-in powered through a supply line consisting of a two-wire cable line connected through said lead-in to said motor and a drill pipe string as the third wire of said supply. A device for testing insulation resistance of the circuit between the cable line and the motor winding is connected between one of the winding phases and said housing and mounted in the inner circular space thereof. The device for testing insulation resistance comprises a thyristor and a diode mounted in one frame having the form of a circular section for dissipating heat from said thyristor and diode and, simultaneously, providing electrical connection to said housing. This arrangement increases the rigidity of the lower end of the drill pipe string, increases the reliability of the entire installation and improves the dependability of the telemetering data obtained in the course of well boring.

2 Claims, 4 Drawing Figures

ELECTRIC DRILL

FIELD OF THE INVENTION

The present invention relates to apparatus used for drilling oil and gas wells and, more particularly, to electrical drills.

BACKGROUND OF THE INVENTION

The present invention can be likewise used on all applications where $n$-phase consumer is powered through a supply line consisting of $n-1$ wires and using a pipe, a cable armor or a cable wire rope as an additional wire.

More particularly the invention can be used in the supply systems of the mining electrical equipment, immersible electrical pumps, etc.

Known in the art are electrical drills whose housing accommodates a three-phase electric motor with a cable lead-in, powered through a supply line consisting of a two-wire cable line and a drill pipe string forming the cable line. Special devices are used with the known electrical drills to connect one of the motor winding phases to the drill pipe string and enable the insulation resistance of the circuit between the cable line and the electric motor winding to be tested relative to frame with the help of surface D.C. measuring instruments. These devices form a separate section of the drill pipe string mounted directly above the electrical drill and consisting of housing portions which are threadably coupled to each other, a sealed container with a switching assembly comprising two semi-conductor elements, a cable section and fastenings.

The cable section of this device terminates at one end in a two-point receptacle for connection to the supply cable and, at the other end, in a three-point receptacle for connection to the electric drill motor.

The presence of an additional device for insulation resistance measurement directly above the electrical drill in the drill pipe string assembly has a number of disadvantages. Firstly, it affects the rigidity of the lower end of the pipe string and, therefore, lowers the effeciency of the heavy drill pipes which is highly undesirable for correct well boring. Secondly, it results in the fact that the telemetering system used for checking the well trajectory and making geophysical tests is removed from the well by a distance equal to the length of the device, which markedly affects the trustworthiness of the telemetering data.

Moreover, the overall reliability of the entire drilling installation is affected to the presence of an additional element made up of a large number of assemblies and parts, including a cable section of a highly complicated design.

OBJECTS OF THE INVENTION

It is the object of the present invention to provide an electrical drill wherein the insulation resistance of the circuit between the cable line and the electric motor winding to be tested without the use of additional technical facilities forming a separate section of the drill pipe string.

With this object in view, the electrical drill comprises a housing which accommodates a three-winding-phase electric motor with a cable lead-in, powered through a supply line. The supply line consists of a two-wire cable line connected through said cable lead-in to said motor and a drill pipe string forming the third wire cable line. A device for testing insulation resistance of the circuit between the cable line and the motor winding, is connected between one of the winding phases and said housing and mounted inside the inner circular space of the thereof, said device comprising a thyristor and a diode mounted in one frame having the form of a circular sector for dissipating heat from said thyristor and diode and simultaneously providing their electrical connection with said housing.

In addition to the frame of the device for testing insulation resistance has at one butt end, ears with holes for attachment of the device to an inner circular butt surface of said housing, and a contact tip located at the opposite butt end of said frame for connection with one of the phase winding leads of the electric motor, said contact tip being insulated from said frame but electrically connected with the bus-bar interconnecting the cathode of the thyristor and the anode of the diode, while the two other electrodes of these elements are connected to the frame of the device.

Such arrangement eliminates the need of an additional section in the drill pipe string thereby increasing the rigidity of the lower end of the pipe string, and brings the telemetering system checking the well trajectory nearer to the well, whereby increasing the trustworthiness of all measurement data.

DESCRIPTION OF THE DRAWING

This and other objects and advantages of the present invention will be better understood from the following description of the specific embodiment of the invention when read in connection with the accompanying drawings in which.

SPECIFIC DESCRIPTION

Figure 1:
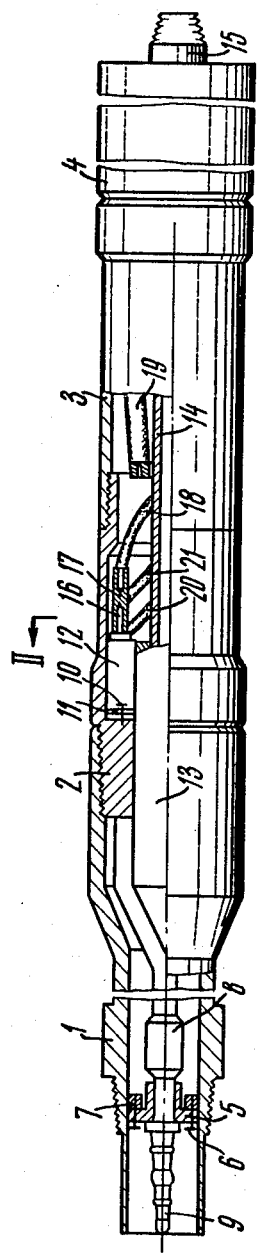
FIG. 1 is a drawing of an electrical drill, according to the invention.

The electrical drill as seen in FIG. 1 comprises a housing made up of a compensator housing 1, an upper housing 2, a stator housing 3 and a spindle housing 4 threadably coupled to each other.

Figure 2:
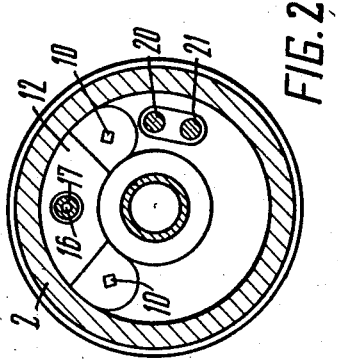
FIG. 2 is a sectional view taken on line II—II of FIG. 1.

A cable lead-in 8 secured with the help of a holder 5 by bolts 6 in slide blocks 7 of the housing 1 has a two-point receptacle 9 for connection to a cable line mounted in the drill pipe string (not shown in the drawing). A semi-conductor device 12 for testing insulation resistance is mounted in the inner circular space of the housing 2 by means of bolts 10 and spring washers 11. The frame of said device being shaped as a circular sector (FIG. 2). The outer diameter of the frame of the device 12 is smaller than the inner diameter of the housing 2 while its inner diameter is larger than the outer diameter of a jacket 13 of the hydro-protection system (not shown in the drawing), which seals a shaft 14 of the motor coupled to a shaft 15 of the spindle. A contact tip 16 of the device 12 is connected by means of a sleeve 17 to one of the phase-leads 18 of a stator winding 19 of the electrical drill motor, while two other phase leads 20 and 21 are connected through a sealed hole in the housing 2 to the cable lead-in 8.

Figure 3:
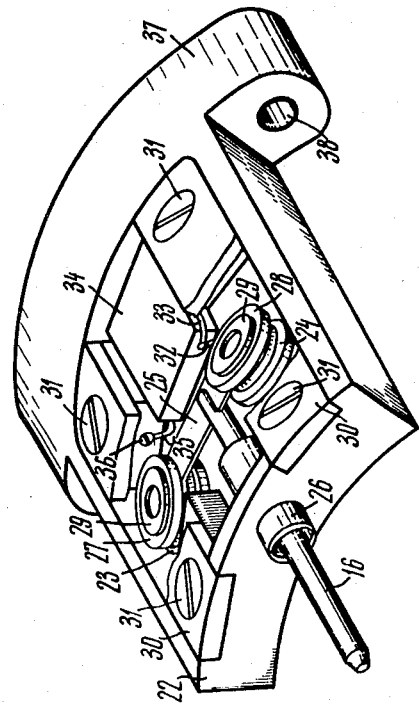
FIG. 3 is a drawing of the device for testing insulation resistance, according to the invention.

A recess in the frame 22 (FIG. 3) shaped as a circular sector accommodates a diode 23 and a thyristor 24 of the tablet type, the diode 23 being connected to the frame 2 through its cathode and the thyristor 24 through its anode. The two other electrodes of these elements are interconnected by a bus-bar 25 to which a contact tip 16, insulated from the frame 22 by a bush 26, is connected. Placed on the bus-bar 25 above the diode 23 and thyristor 27 are washers 27 and 28 made of mechanically strong and rigid dielectric material. Mounted on the washers are disk springs 29 which ensure a reliable contact between the diode 23 and thyristor 24 and the bus-bar 25 on one side and the elements 23 and 24 and the frame 22 on the other when covers 30 are secured by screws 31. The washer 28 has a radial slot on the surface facing the bus-bar 25 which, in its turn, has a hole located centrally with respect to the thyristor 24. A centrally located control electrode 32 of the thyristor 24 isolated from the bus-bar 25 is brought out through the hole in the bus-bar 25 and the slot in the washer 28. The control electrode 32 is connected to one of the leads 33 of a capacitor 34 mounted in the recess of the frame 22. A second lead 35 of the capacitor 34 is connected to the frame 22 by a screw 36. The device 12 is attached to the inner butt surface of the outer housing of the electrical drill by means of symmetrical ears 37 with holes 38 located on one butt end of the frame 22. If necessary, the diode 23 and thyristor 24 may be sealed by filling the inner space of the device with epoxy compound after assembly.

Figure 4:
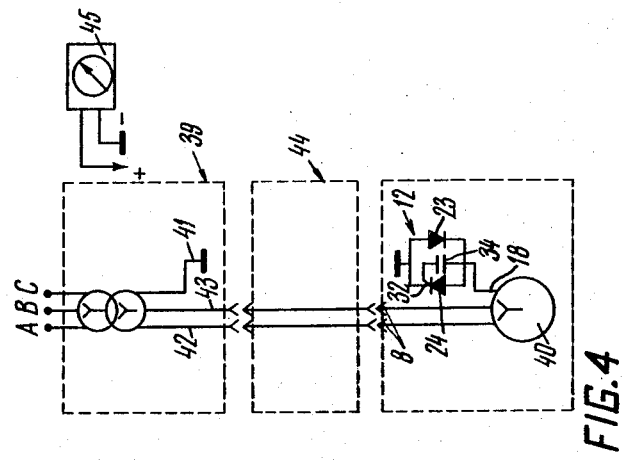
FIG. 4 is a schematic diagram of the device for testing insulation resistance.

FIG. 4 shows the connection of the electrical drill to the supply system.

In a supply unit 39 of the electrical drill motor 40 a phase 41 is connected to the drill pipe string ("ground") having a third cable line. The phases 42 and 43 of the unit 39 are connected to the two-wire cable lead-in 8 of the electrical drill through a two-wire cable line 44 mounted in the drill pipe string, while a lead 18 of the electrical drill is connected through the device 12 to the frame ("ground"). An instrument 45 is used to check insulation resistance when the system is de-energized.

The arrangement described above operates as follows. When the electrical drill motor 40 is supplied with A.C. working voltage all three winding phases of the motor 40 are normally traversed by current, the negative halfwave from the side of the switched phase being passed by the diode 23, the positive half-wave, by the thyristor 24, the control electrode 32 of which is energized from the capacitor 34.

When the system is de-energized (for insulation resistance measurement) a D.C. test voltage of a low power is applied from the surface measuring instrument 45 to one of the phases of the cable line while the other pole of the instrument 45 is grounded. At this time the following polarity requirements are observed: the positive pole of the instrument is applied to the cable, the negative pole, to ground. The diode 23 is unable to pass current of such polarity. The thyristor 24 also remains non-conductive as the capacitor 34 does not pass direct current.

In this way a switching assembly cut off for the test current is brought into the circuit of the switched phase between the motor winding and the frame ("ground") whereby enabling the insulation resistance of the system with respect to the frame ("ground") to be tested.

What is claimed is:

1. An electrical drill comprising: a housing; a three-winding-phase electric motor with a wound stator, a rotor, a cable lead-in within said housing, said motor being powered through a wire supply line comprised of a two-wire cable line connected through said lead-in to said motor and a drill pipe string forming said third wire; a device for testing insulation resistance of a circuit between the cable line and the winding of said motor, connected between one of the motor winding phases and said housing and mounted in an inner circular space of said housing; a frame having the form of a circular sector; and a thyristor and diode mounted in said frame for dissipating heat from said thyristor and diode and, simultaneously, providing their electrical connection to said housing.

2. An electrical drill as of claim 1, wherein said frame includes two butt ends, one of said butt ends including a pair of butt end ears, each provided with a hole at one butt end, for attachment of an inner circular butt surface of the housing, a contact tip for connection with one of the winding phase leads of said electric motor located at the other of said butt ends, said contact tip being insulated from said frame; a bus-bar electrically connected to said tip, interconnecting the cathode of said thyristor and the anode of said diode, the other two electrodes of said thyristor and diode being connected to said frame.

* * * * *